(12) United States Patent
Ford et al.

(10) Patent No.: US 9,829,161 B2
(45) Date of Patent: Nov. 28, 2017

(54) BATTERY COMPARTMENT ADAPTER CAP HOUSING RECHARGEABLE BATTERY AND DEVICE EQUIPPED THEREWITH

(71) Applicant: 9609385 CANADA INC., Beaconsfield (CA)

(72) Inventors: Timothy D. F. Ford, Beaconsfield (CA); Stéphane Gascon, Mascouche (CA)

(73) Assignee: 9609385 CANADA INC., Beaconsfield (CA)

( * ) Notice: Subject to any disclaimer, the term of this patent is extended or adjusted under 35 U.S.C. 154(b) by 0 days.

(21) Appl. No.: 14/460,480

(22) Filed: Aug. 15, 2014

(65) Prior Publication Data
US 2014/0355260 A1 Dec. 4, 2014

Related U.S. Application Data

(60) Division of application No. 12/271,848, filed on Nov. 15, 2008, now abandoned, which is a continuation of
(Continued)

(51) Int. Cl.
*F21L 4/08* (2006.01)
*F21V 23/00* (2015.01)
(Continued)

(52) U.S. Cl.
CPC ............... *F21L 4/08* (2013.01); *B60Q 3/88* (2017.02); *F21L 4/027* (2013.01); *F21V 23/006* (2013.01);
(Continued)

(58) Field of Classification Search
CPC ...... H03K 17/78; H03K 17/785; H03K 17/79; H03K 17/795; H03K 17/7955; H03K 7/30; H03K 17/302; H03K 17/51; H03K 17/56; H03K 17/60; H03K 17/602; H03K 17/603; H03K 17/687; H05B 33/00; H05B 33/02; H05B 33/0803; H05B 33/0806; H05B 33/0833; H05B 33/0839; H05B 33/0842; H05B 33/0845; H05B 33/0848; H05B 33/12; H05B 37/00; H05B 37/02; H05B 39/00; H05B 39/02; H05B 39/04; H05B 30/041; H05B 30/042; H05B 39/06;
(Continued)

(56) References Cited

U.S. PATENT DOCUMENTS 4,092,580 A * 5/1978 Prinsze .................. 320/115
4,114,187 A 9/1978 Uke
(Continued)

FOREIGN PATENT DOCUMENTS

DE 37 33 580 A1 10/1987
DE 41 27 765 A1 2/1993

*Primary Examiner* — John Lee
(74) *Attorney, Agent, or Firm* — Hugh Mansfield

(57) ABSTRACT

A signalling device comprising an emission module operative on the application of battery power from a rechargeable battery for the emission of a signal from at least one electromagnetic radiation emitting element, a battery compartment and a cap for housing the rechargeable battery and covering an opening of said battery compartment. The cap includes circuitry for charging the battery and a socket for receiving an external power input.

14 Claims, 10 Drawing Sheets

Related U.S. Application Data application No. 11/056,088, filed on Feb. 14, 2005, now Pat. No. 7,459,666.

(60) Provisional application No. 60/544,180, filed on Feb. 13, 2004.

(51) Int. Cl.
  *F21V 23/04* (2006.01)
  *F21L 4/02* (2006.01)
  *B60Q 3/88* (2017.01)
  *F21Y 115/10* (2016.01)

(52) U.S. Cl.
  CPC .......... *F21V 23/04* (2013.01); *F21V 23/0414* (2013.01); *F21V 23/0442* (2013.01); *F21Y 2115/10* (2016.08)

(58) Field of Classification Search
  CPC ........ H05B 41/00; H05B 41/02; H05B 41/04; H05B 41/042; H05B 41/18; H05B 41/36; H05B 41/38; F21V 23/00; F21V 23/003; F21V 23/04; F21V 23/0407; F21V 23/0414; F21V 23/0421; F21V 23/0442; F21V 23/0457
  USPC .............. 250/214.1, 205, 239, 221, 214 SW; 362/208, 205, 251, 800, 183; 345/30–33, 345/44–55, 76–84; 340/815.42–815.45, 340/815.65–815.67
  See application file for complete search history.

(56) References Cited

U.S. PATENT DOCUMENTS

| | | | |
|---|---|---|---|
| 4,325,107 A | 4/1982 | MacLeod | |
| 4,357,648 A * | 11/1982 | Nelson | ............ 362/183 |
| 4,819,139 A * | 4/1989 | Thomas | ......... F21L 4/085 362/183 |
| 4,823,242 A * | 4/1989 | Maglica et al. | ............ 362/187 |
| 4,866,580 A | 9/1989 | Blackerby | |
| 5,161,879 A | 11/1992 | McDermott | |
| 5,197,796 A * | 3/1993 | Moore | ............ F21V 15/01 362/157 |
| 5,590,951 A * | 1/1997 | Matthews | ............ F21L 4/005 362/203 |
| 5,629,105 A | 5/1997 | Matthews | |
| 5,671,999 A * | 9/1997 | Guthrie et al. | ............ 362/184 |
| 5,697,695 A | 12/1997 | Lin et al. | |
| 5,900,212 A | 5/1999 | Maiden et al. | |
| 5,918,189 A | 6/1999 | Kivela | |
| 6,086,218 A | 7/2000 | Robertson | |
| 6,095,661 A * | 8/2000 | Lebens et al. | ............ 362/184 |
| 6,307,695 B1 | 10/2001 | Bhandari | |
| 6,616,300 B1 | 9/2003 | Hrabal | |
| 6,642,667 B2 | 11/2003 | Avis | |
| 6,703,786 B2 | 3/2004 | Tannenbaum | |
| 6,808,287 B2 | 10/2004 | Lebens et al. | |
| 6,841,941 B2 | 1/2005 | Kim et al. | |
| 7,220,016 B2 | 5/2007 | Matthews et al. | |
| 7,315,036 B2 * | 1/2008 | Ford | ......... F21L 4/02 250/493.1 |
| 7,459,666 B2 * | 12/2008 | Ford et al. | ............ 250/214 SW |
| 2005/0122714 A1 | 6/2005 | Matthews et al. | |
| 2005/0128741 A1 * | 6/2005 | Matthews | ............ F21L 4/027 362/206 |
| 2005/0269480 A1 * | 12/2005 | Ford | ............ F21L 4/02 250/200 |
| 2006/0061347 A1 * | 3/2006 | Ford | ............ F21L 4/02 323/358 |
| 2006/0092623 A1 | 5/2006 | Irisawa | |
| 2006/0171145 A1 * | 8/2006 | Ford | ............ F21L 4/027 362/200 |
| 2007/0205905 A1 * | 9/2007 | Ford | ............ B63C 9/0005 340/573.6 |
| 2008/0129529 A1 * | 6/2008 | Ford | ............ F21L 4/02 340/686.1 |
| 2009/0067166 A1 * | 3/2009 | Ford et al. | ............ 362/208 |
| 2014/0355260 A1 * | 12/2014 | Ford | ............ F21L 4/027 362/183 |

* cited by examiner

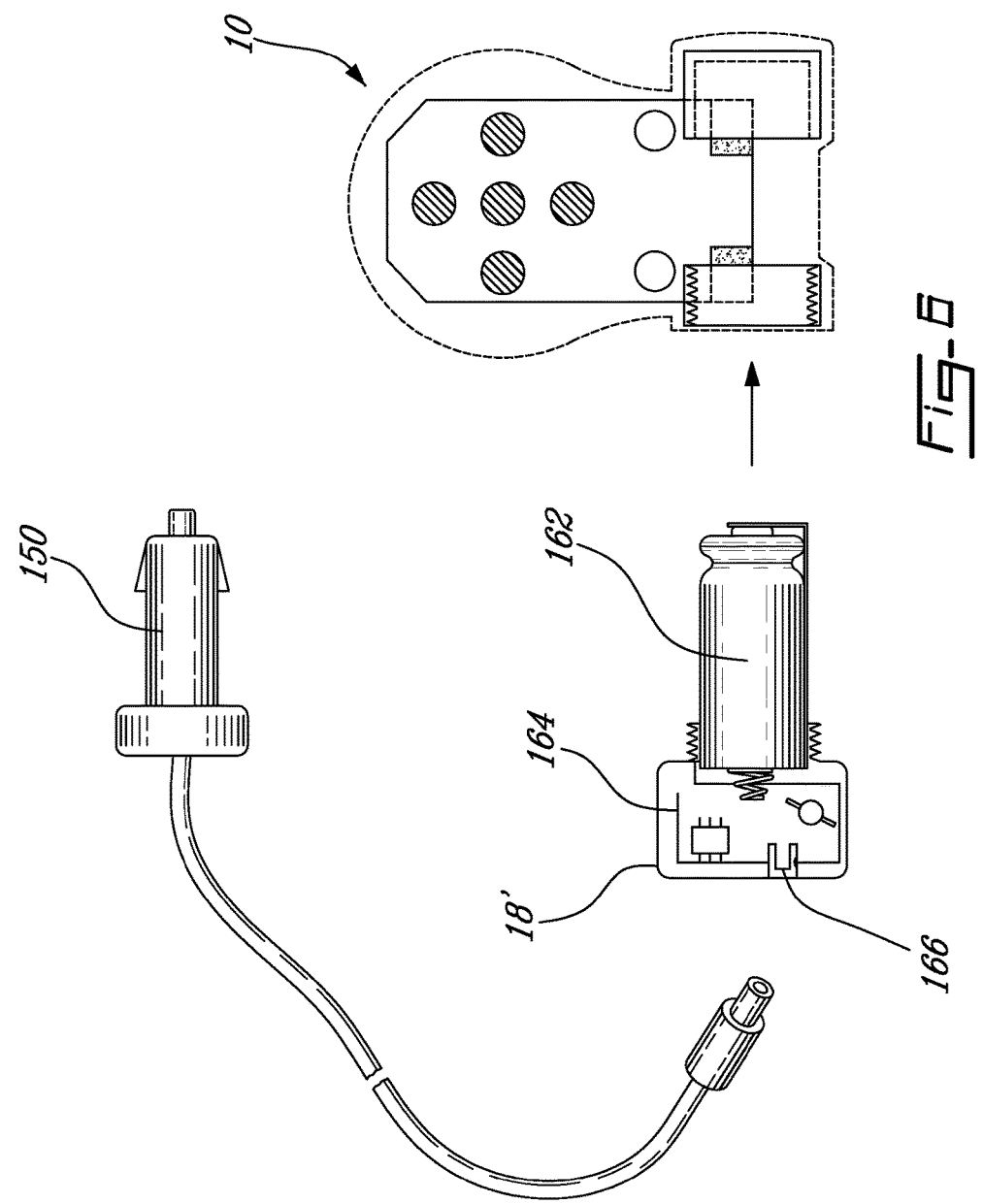

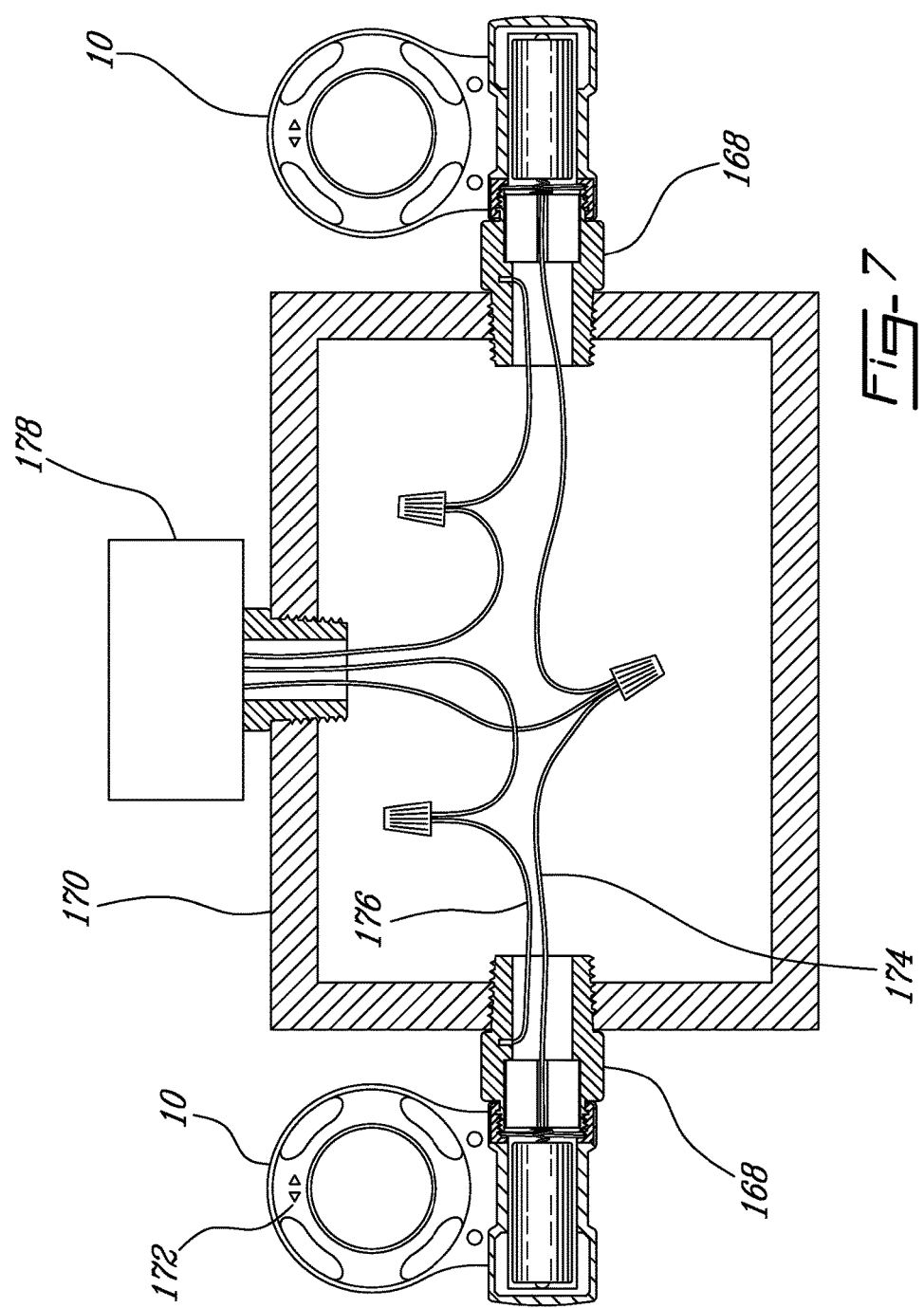

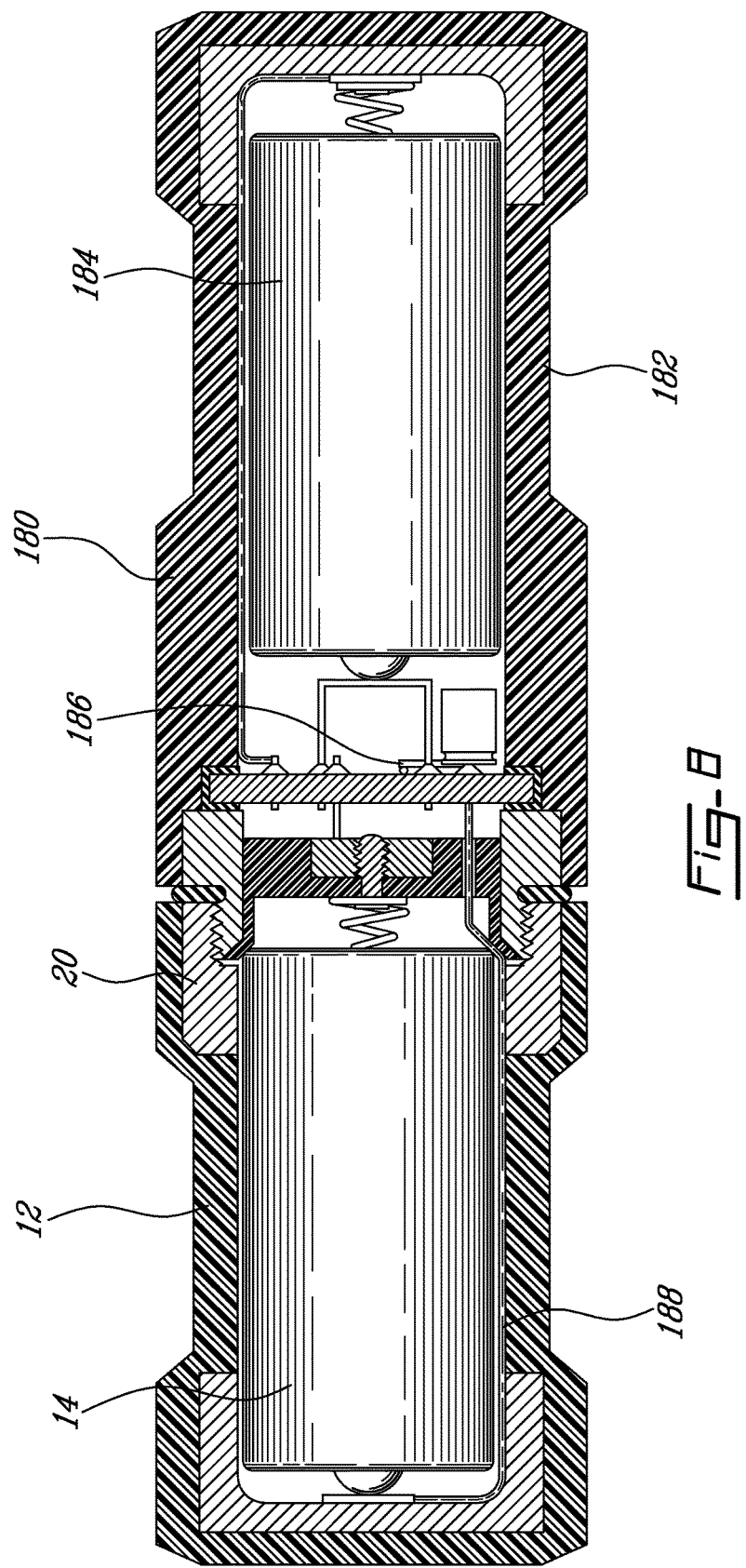

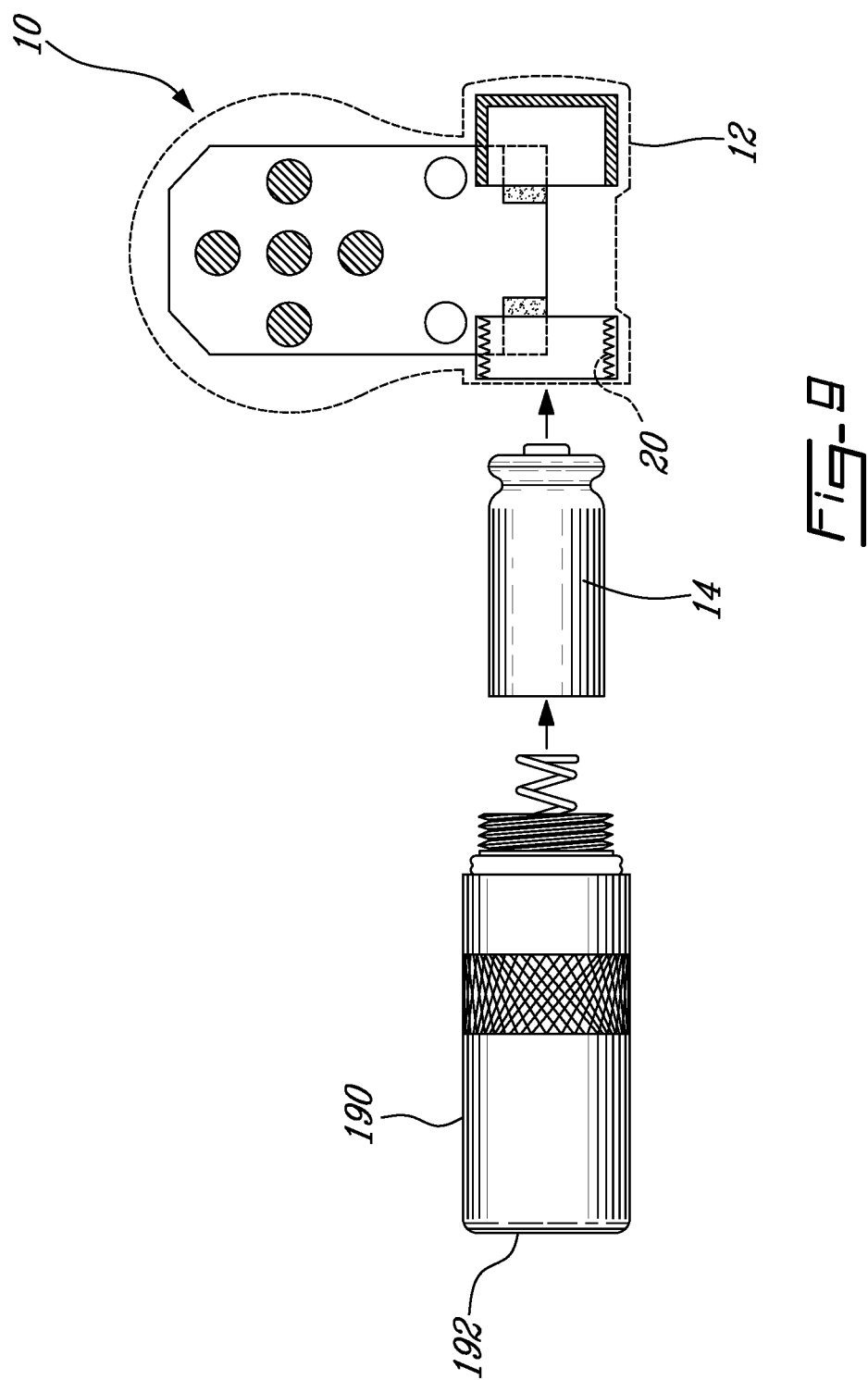

BATTERY COMPARTMENT ADAPTER CAP HOUSING RECHARGEABLE BATTERY AND DEVICE EQUIPPED THEREWITH

This application is a Divisional of U.S. application Ser. No. 12/271,848 entitled WIRELESS BATTERY COMPARTMENT ADAPTER CAP FOR CONTROL OF ELECTRIC POWER AND DEVICE EQUIPPED THEREWITH, filed on Nov. 15, 2008 which was a Continuation of U.S. application Ser. No. 11/056,088 entitled BATTERY COMPARTMENT ADAPTER CAP FOR CONTROL OF ELECTRIC POWER AND DEVICE EQUIPPED THEREWITH, filed on Feb. 14, 2005 and which claimed priority to U.S. Provisional Application No. 60/544,180, filed Feb. 13, 2004. The entire contents of the foregoing Patent Applications are hereby incorporated by reference.

FIELD OF THE INVENTION

The present invention relates to a battery compartment adaptor cap housing a rechargeable battery and devices equipped with the battery compartment adaptor cap.

BACKGROUND OF THE INVENTION

The prior art reveals a variety of light emitting devices not only for the purposes of illumination but also for notification, alerting and identification. Recent improvements in high-intensity light emitting diodes (LEDs) have allowed arrays of small high-intensity lights of differing colours or wavelengths to be combined in a single signaling device.

A drawback of these prior art inventions is that they typically provide on limited functionality, thereby limiting their use to a small number of applications.

SUMMARY OF THE INVENTION

In order to address the above and other drawbacks there is disclosed a light emitting device comprising an emission module operative on the application of battery power and comprising at least one light emitting element, a battery compartment shaped for receiving a battery having a standard format and defining an opening through which the standard format battery can be inserted into the battery compartment, a rechargeable battery for powering the emission module, a switch for turning on and off the emission module, and a battery compartment cap for closing the opening and configured for insertion into the battery compartment, the battery compartment cap housing the rechargeable battery and comprising a battery charger circuit for recharging the battery and an external socket coupleable to an external power source for receiving power for recharging the battery.

Other objects, advantages and features of the present invention will become more apparent upon reading of the following non-restrictive description of illustrative embodiments thereof, given by way of example only with reference to the accompanying drawings.

BRIEF DESCRIPTION OF THE DRAWINGS

FIG. 6 provides an embodiment of an adapter cap including a rechargeable power source and charger in accordance with a third alternative illustrative embodiment of the present invention;

FIG. 7 provides an embodiment of an adapter cap for providing a sealed interconnect between a device and an electrical junction box in accordance with a fourth alternative illustrative embodiments of the present invention;

FIG. 8 provides an embodiment of an adapter cap comprising a supplementary power source and voltage conditioning electronics in accordance a fifth alternative illustrative embodiments of the present invention; and FIG. 9 provides an embodiment of an adapter cap comprising a laser module in accordance with a sixth alternative illustrative embodiments of the present invention.

DETAILED DESCRIPTION OF THE ILLUSTRATIVE EMBODIMENTS

As is well known in the art, the battery compartment caps of many devices, in particular but not limited to those which emit light such as flashlights and the like, traditionally serve a dual purpose: firstly sealing the battery compartment thereby providing protection against the infiltration of moisture and dirt into the compartment; and secondly providing a point (or points) of electrical contact between the battery or batteries contained within the compartment and the electronics which are powered by the batteries.

Typically, the inside surface of the battery compartment cap is equipped with a raised biased contact plate or helical spring manufactured from a conductive material for contact with the anode (or cathode) of a battery. Additionally, the raised or biased contact plate or helical spring is also in electrical contact with the conductive casing of the battery compartment. Thus, placing batteries into the battery compartment and securing the battery compartment cap to the device is all that is necessary to complete an electronic circuit, thereby providing power to the electronics of the device (which also may or may not include an additional on/off switch for interrupting the flow of electrical power to the electronics).

Figure 1:
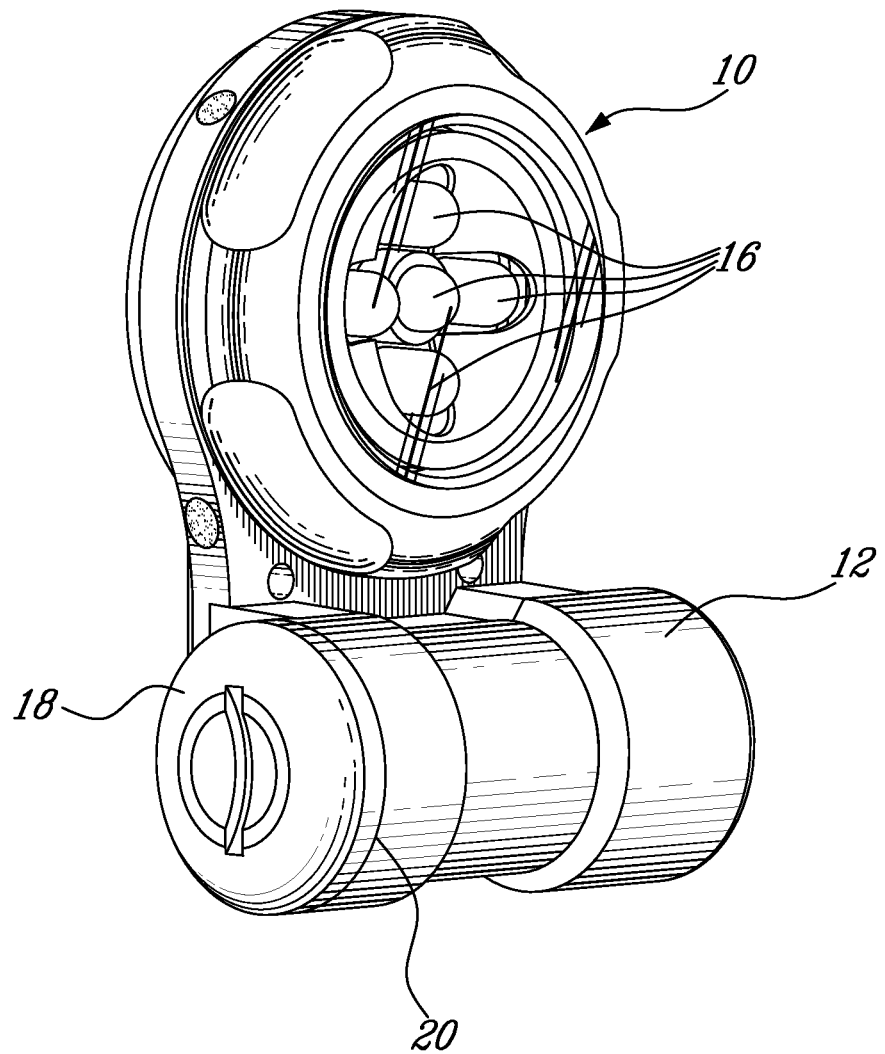
FIG. 1 is a raised front perspective view of a device in accordance with an illustrative embodiment of the present invention.

Referring now to FIG. 1, a device 10, such as a conventional flashlight, equipped with a battery compartment 12 for housing a single battery 14 for powering an emission module comprising a controller (not shown) which, controls one or more electromagnetic radiation emitting elements 16, such as LEDs, lasers, incandescent lights, thermal emitters, xenon strobes, etc., is disclosed. A battery compartment cap 18 is screwed on to the threaded end 20 of the battery compartment 12 thereby preventing the egress of moisture and dirt into the compartment 12. The device 10 may also include a multi-position rotary switch 21. Selection of a particular position on the rotary switch 21 causes the electromagnetic radiation emitting elements 16 to be activated, when power from the battery 14 is applied to the controller, according to a selected one of a multiple of control signatures which are stored in memory (not shown). Using the signatures, the electronics control the electromagnetic radiation emitting elements 16 to emit radiation (such as visible light) according to a predefined sequence, for example by flashing repeatedly or according to a recognised pattern, such as the Morse Code for SOS, which is repeated.

Figure 2:
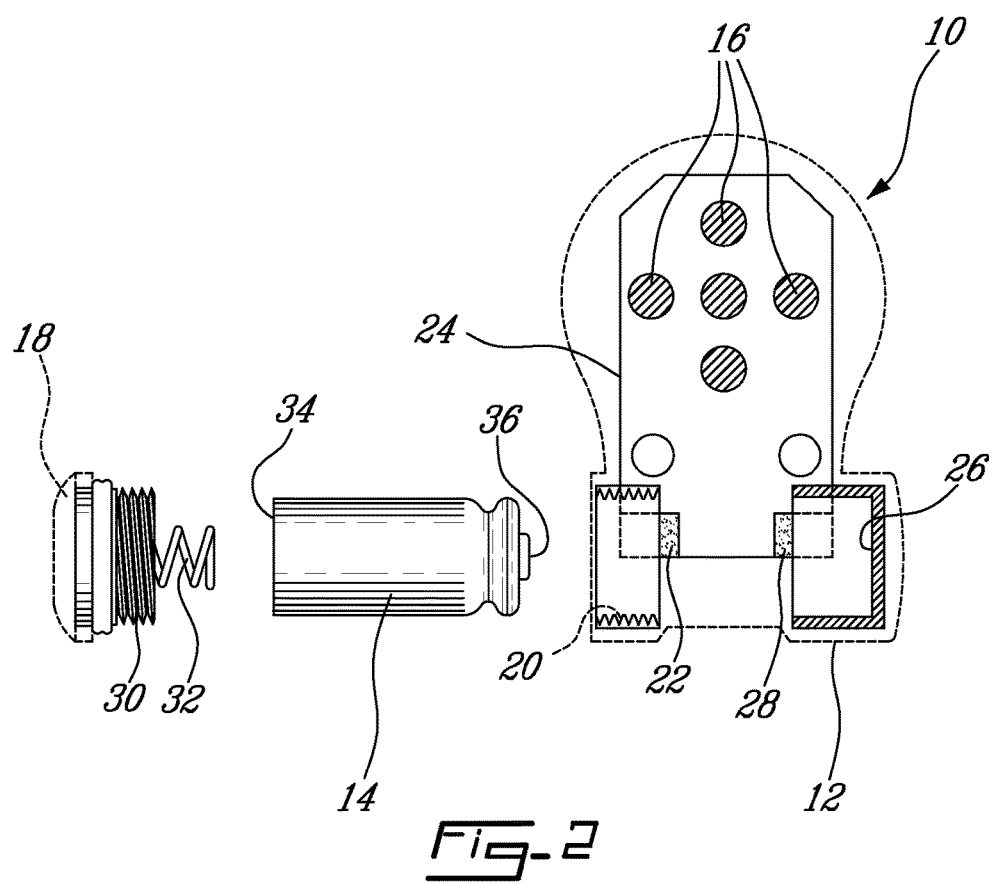
FIG. 2 is a front schematic view of a device in accordance with an illustrative embodiment of the present invention.

Referring now to FIG. 2, the threaded end 20 of the battery compartment is manufactured from a conductive material such as brass and is mounted on a first conductive pad 22 etched into the surface of a printed circuit board (PCB) 24 onto which are also mounted the electronics (not shown) and the elements 16. Similarly, the closed end 26 of the battery compartment 12 is manufactured from a conductive material such as brass and is mounted to a second conductive pad 28 etched into the surface of a printed circuit board (PCB) 24. Both the threaded end 20 and the closed end 26 are mounted to the PCB 24 using, for example, a conductive solder.

The battery compartment cap 18 includes a threaded portion 30, manufactured from a conductive material such as brass, and adapted to mate with the threaded end 20 of the battery compartment 12. The threaded portion 30 is in electrical contact with a conductive helical spring 32. As will now be apparent to a person of ordinary skill in the art, when a battery 14 is inserted into the battery compartment 12 and the cap 18 screwed onto the threaded end 20 of the of the battery compartment 12, the threaded portion 30 of the cap 18, and thus the helical spring 32 and the anode 34 of the battery 14 (or cathode 36, depending on the orientation of the battery 14), is in electrical contact with the threaded end 20 of the battery contact and thus with the first conductive pad 22. Similarly, the biasing action of the helical spring 32 forces the cathode 36 (or anode depending on the orientation of the battery 14) into electrical contact with the closed end 26 of the battery compartment, and thus with the second conductive pad 28.

Figure 3:
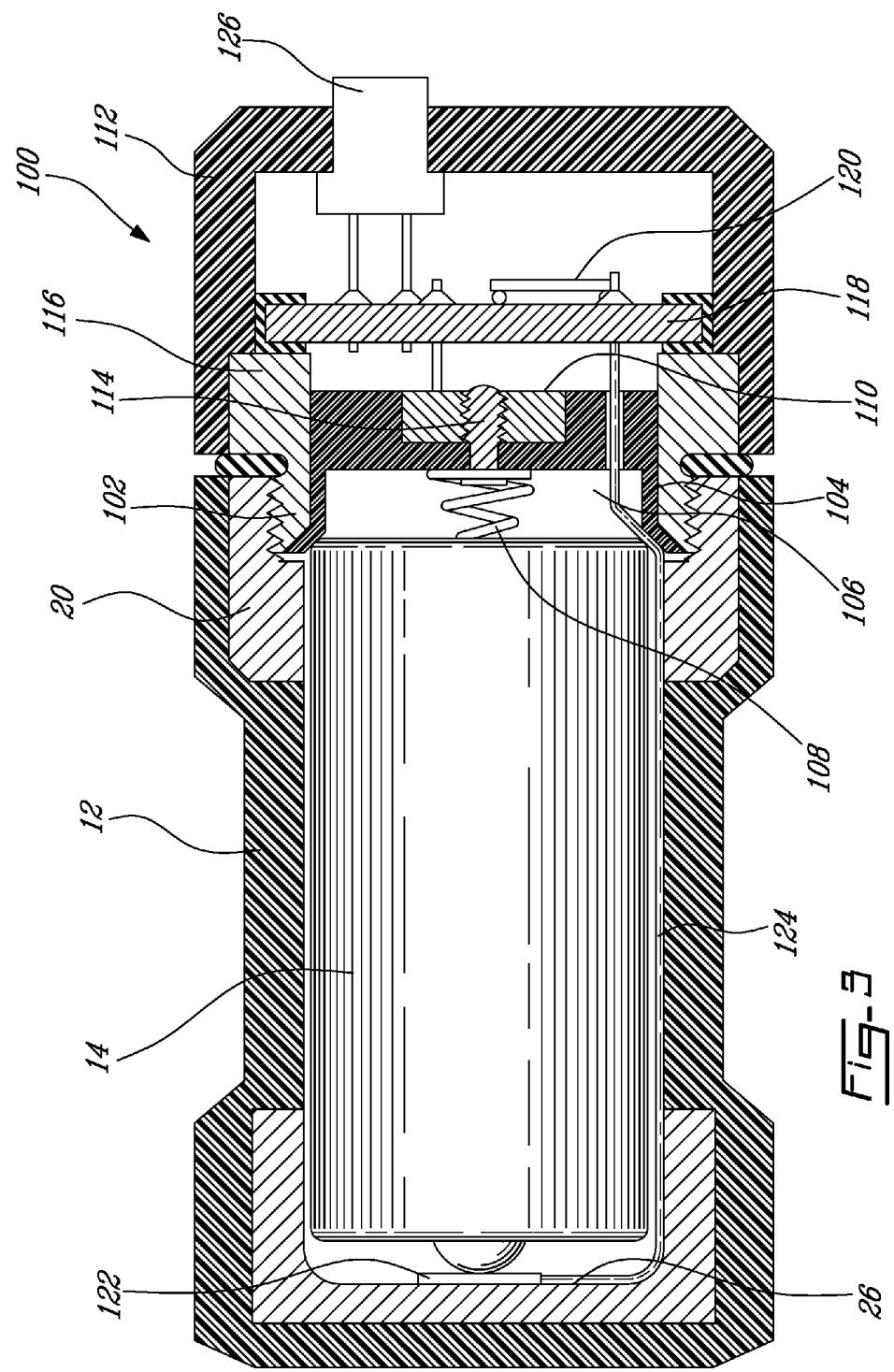
FIG. 3 is a cutaway view of a device in accordance with an illustrative embodiment of the present invention.

Referring now to FIG. 3 in addition to FIGS. 1 and 2, a battery compartment adapter cap, generally referred using the reference numeral 100, in accordance with an illustrative embodiment of the present invention will be described. The battery compartment adapter cap 100 is intended to replace conventional battery compartment caps, such as the battery compartment cap 18. The adapter cap 100 comprises a threaded portion 102, manufactured from a conductive material such as brass, and adapted to mate with the threaded end 20 of the battery compartment 12 thereby allowing electrical energy to flow between the threaded portion 102 and the threaded end 20 of the battery compartment 12. A dielectric insert 104 fabricated from a non conductive material is inserted into the mouth 106 of the adapter cap 100 which is defined by the threaded portion 102. Alternatively, the inside of threaded portion 102 could be coated with a dielectric material. In this manner, the dielectric insert 104 maintains the anode 34 (or cathode 36 depending on orientation) of a battery 14 held in the battery compartment 12 normally isolated from the conductive threaded portion 102 of the adapter cap.

Still referring to FIG. 3, as the adapter cap 100 is screwed onto the threaded end 20 of the battery compartment 12, a biasing means 108, such as spring, manufactured from a conductive material such as steel, engages the anode 34 (or cathode 36 depending on orientation) of the battery 14, thereby biasing the battery 14 toward the closed end 26 of the battery compartment 12 thus holding the battery 14 securely therein. The biasing means 108 is in turn fastened to a contact plate 110 encapsulated within the non-conductive cover 112 of the adapter cap 100, manufactured from a conductive material such as brass, by means of a fastener 114 (such as a bolt, screw, rivet, or the like), also manufactured from a conductive material such as steel. As a result, the anode 34 (or cathode 36 depending on orientation) of the battery 14 is in direct electrical contact with the conductive contact plate 110, but not, as in the case of the conventional battery compartment cap 18, with the threaded end 20 of the battery compartment 12.

Referring back to FIG. 2, severing direct contact between the anode (or cathode 36 depending on orientation) of the battery 14 from the threaded end 20 of the battery compartment 12, and thus the PCB 24 onto which are mounted the electronics (not shown) and the elements 16, allows the device 10 to be adapted to a variety of different uses by providing a series of adapter caps which carry out different functions. For example, referring back to FIG. 3, a simple two conductor cable with a first conductor soldered to the contact plate 110 and a second conductor soldered to a contact surface 116 of the threaded portion 102, with a single pole switch attached between the far ends of the first conductor and the second conductor, would allow the electronic device 10 to be activated from remote position by simply flipping the switch and closing the circuit.

Alternatively, still referring to FIG. 3, for example, illustratively a Printed Circuit Board (PCB) 118 could be encapsulated within the cap, the PCB 118 having conductive traces (not shown) etched therein as well as conductive pads (also not shown) for mounting electronic switch electronics as in 120 and the like using, for example, conductive solder. Additionally, in order to supply the electronics 120 mounted on the PCB 118 provision is made by way of a conductive plate 122 located at the closed end 26 of the battery compartment 12. An insulated conductor 124, such as a wire or conductive strip, is also provided to interconnect the conductive plate 122 and the PCB 118. Of course, given that the polarity of the battery may be reversed during operation, provision must also be made within the electronics 120 of a battery polarity converting device (not shown) to ensure that the correct voltage and current is provided to the electronics. Alternatively, the electronics 120 on the PCB 118 could be supplied with power from a dedicated source, such as a small mignon cell or other types of batteries (all not shown) with provision of suitable adaptations to the adaptor cap 10. As will now be apparent to a person of ordinary skill in the art, by interconnecting the contact plate 110 and the contact surface 116 via the electronics mounted on the PCB 118, sophisticated devices can be developed for switching the electronic device 10 on and off, for example by sensing or detecting changes in the devices immediate environment. Such device environment changes include, for example, a change in pressure, change in light incident on the device, sensing of noxious gasses, detection of movement, sensing of sound, submersion of the device in water, etc. Additionally, provision can made for operating the device remotely, for example though provision of a wireless interface. A variety of possible configurations are possible. The following is a non-limiting series of possible embodiments:

A photodiode 126 or similar light sensitive device could be mounted in the non-conductive cover 112 allowing the device 10 to automatically actuate the switch by completing the circuit between the contact plate 110 and the contact surface 116, thus powering up the electronic device 10 when the amount of light incident on the photodiode 126 falls below (or rises above) a pre-determined level;

alternatively, the photodiode 126 could be replaced by a water sensor, (along with suitable adaptation of the electronics on the PCB 118 of course), thereby allowing the device 10 to automatically actuate the switch by completing the circuit between the contact plate 110 and the contact surface 116 for example when the device 10 is submerged in water;

the photodiode 126 could be replaced by a device sensitive to infra-red light (along with suitable adaptation of the electronics on the PCB 118), thereby allowing the switch to be actuated by remotely completing the circuit between the contact plate 110 and the contact surface 116 using an infra-red emitter;

the photodiode 126 could be replaced by a motion detector (along with suitable adaptation of the electronics on the PCB 118), thereby allowing the switch to be actuated automatically by completing the circuit between the contact plate 110 and the contact surface 116 when an object moves within range of the device 10;

the photodiode 126 could be replaced by a small microphone (along with suitable adaptation of the electronics on the PCB 118), thereby allowing the switch to be actuated automatically by completing the circuit between the contact plate 110 and the contact surface 116 when a triggering sound, for example sound in a particular frequency range exceeding a predetermined decibel level, is detected in the vicinity of the device 10;

the photodiode 126 could be replaced by a pressure sensor, (along with suitable adaptation of the electronics on the PCB 118), thereby allowing the switch to be actuated automatically by completing the circuit between the contact plate 110 and the contact surface 116 when the ambient pressure exceeds or is under a predetermined value;

the photodiode 126 could be replaced by a gas sensor, for example for carbon monoxide, (along with suitable adaptation of the electronics on the PCB 118), thereby allowing the switch to be actuated automatically by completing the complete the circuit between the contact plate 110 and the contact surface 116 when the particular gas is detected in the vicinity of the device 10;

the photodiode 126 could be replaced by a switch adapted for attachment to a trip-wire (along with suitable adaptation of the electronics on the PCB 118). In this embodiment, the circuit between the contact plate 110 and the contact surface 116 would be completed when the switch was is closed by a triggering tension applied to the trip wire. The switch could be biased normally open, for example using a spring, such that once a triggering tension is removed from the trip wire, the switch returns to its normally open position. Additionally, a sound emitting device, such as a piezo electric membrane, could also be built into the adapter cap 100 to provide an audible warning;

a RF-receiver could be mounted on the PCB 118 along with the requisite electronics, thereby allowing the circuit between the contact plate 110 and the contact surface 116 to be completed remotely using a RF transmission; etc.

On the other hand, the provision of an adapter cap 100 can also be used to provide other features not otherwise available with the electronic device 10.

In the present illustrative embodiment, the electromagnetic radiation emitting sources 16 as well as the electronics which drive them can be powered from powers sources having a variety of different output voltages. It will be apparent to a person of ordinary skill in the art that the battery 14 used to illustrate the present invention is a battery of the 123A type having a nominal output voltage of 3 volts.

Figure 4A:
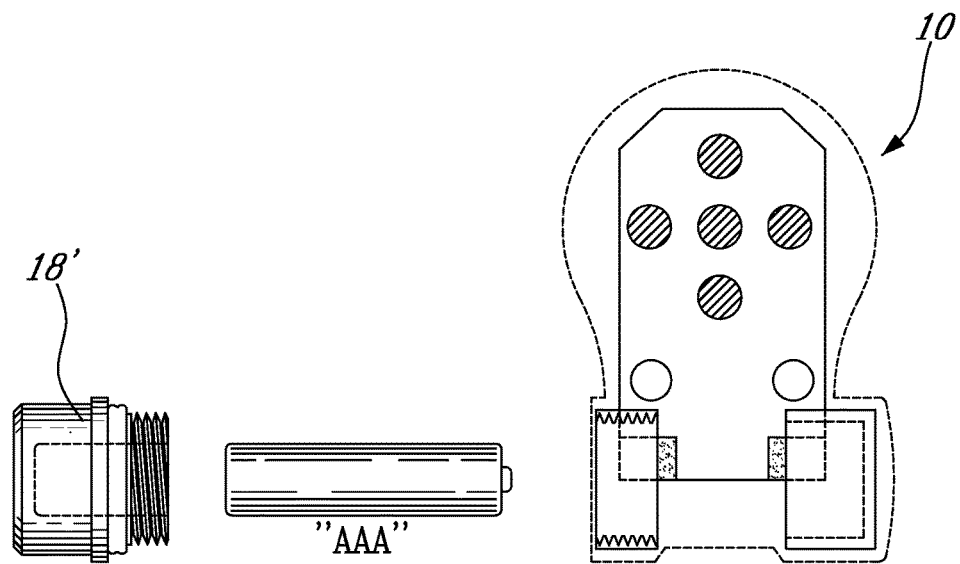
FIGS. 4A through 4C provide embodiments of adapter caps for adapting different classes of batteries for powering a device.
Figure 4B:
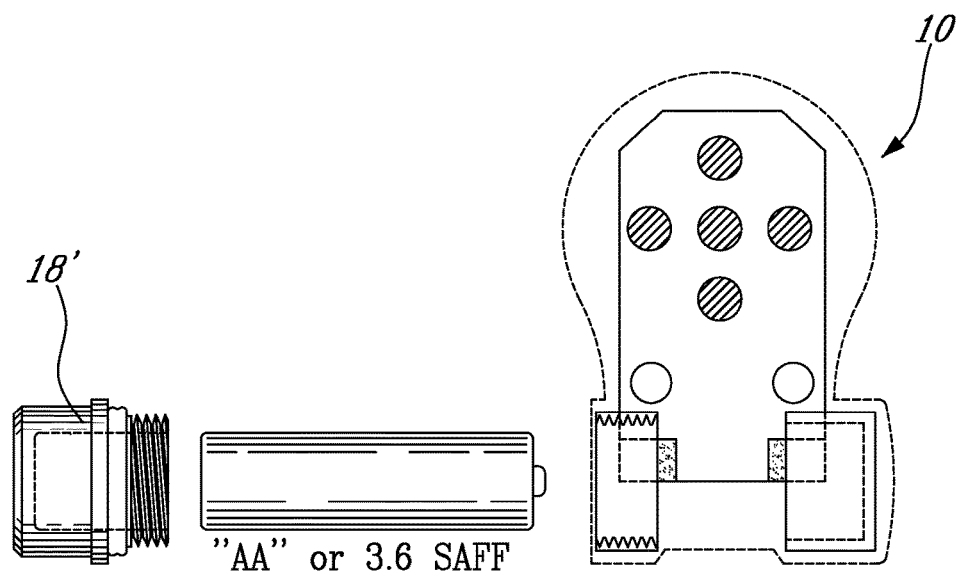
Figure 4C:
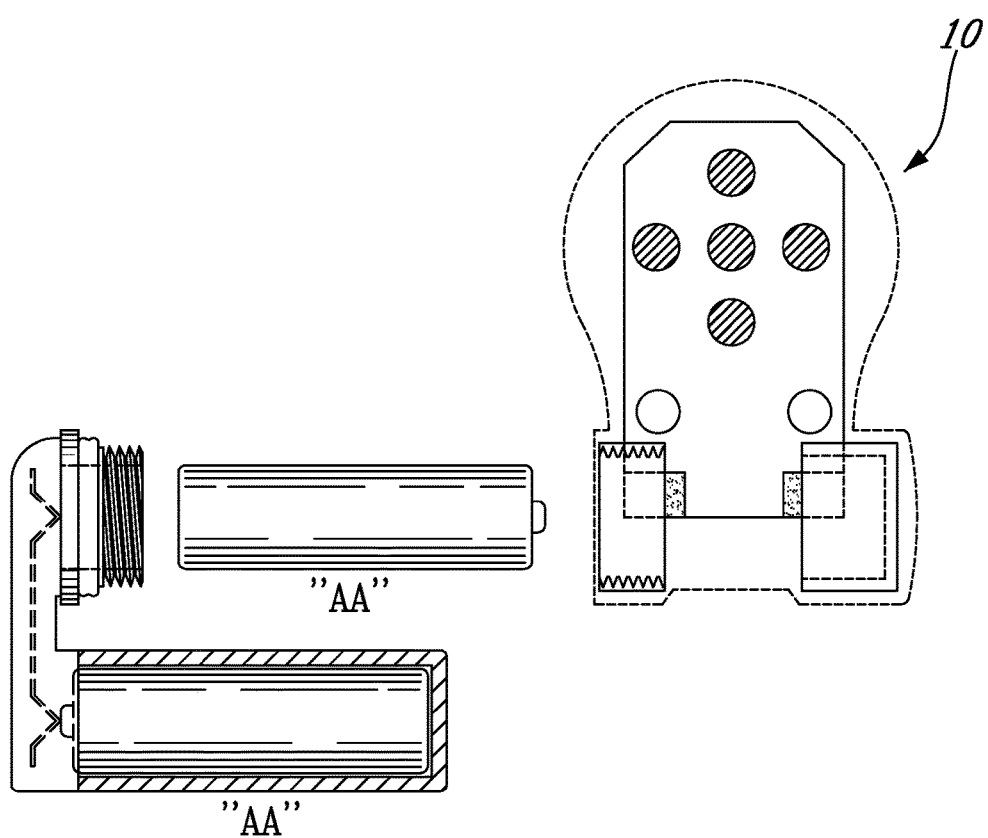

Referring now to FIGS. 4A through 4C, by providing different caps, adapted to different battery sizes, batteries other than those of the 123A type, and even multiple batteries, can be used to power the device 10.

Figure 5A:
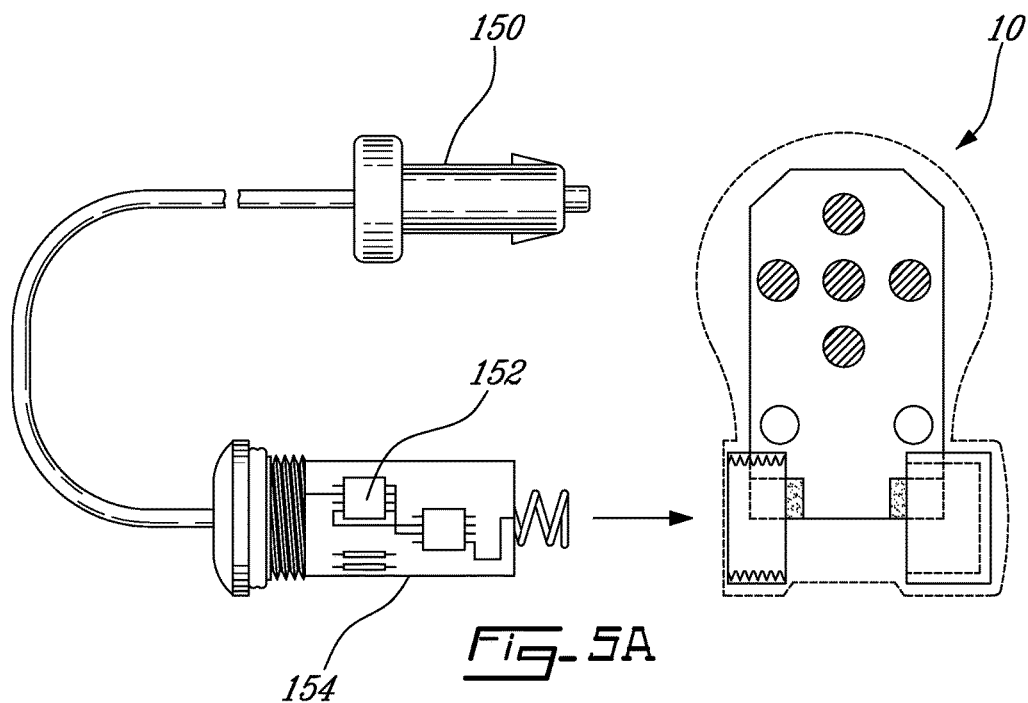
FIGS. 5A and 5B provide embodiments of adapter caps for adapting different non battery power sources for powering a device in accordance with alternative and second alternative illustrative embodiments of the present invention.

Referring now to FIG. 5a, in an alternative embodiment a car lighter adapter 150 is attached to the adapter cap which, via electronics as in 152 mounted on a printed circuit board (PCB) 154 provides power to the device 10. In this regard, the output of a car battery is typically 12 volts and therefore the electronics would include, for example, an isolated DC/DC converter providing a 3V DC output.

Figure 5B:
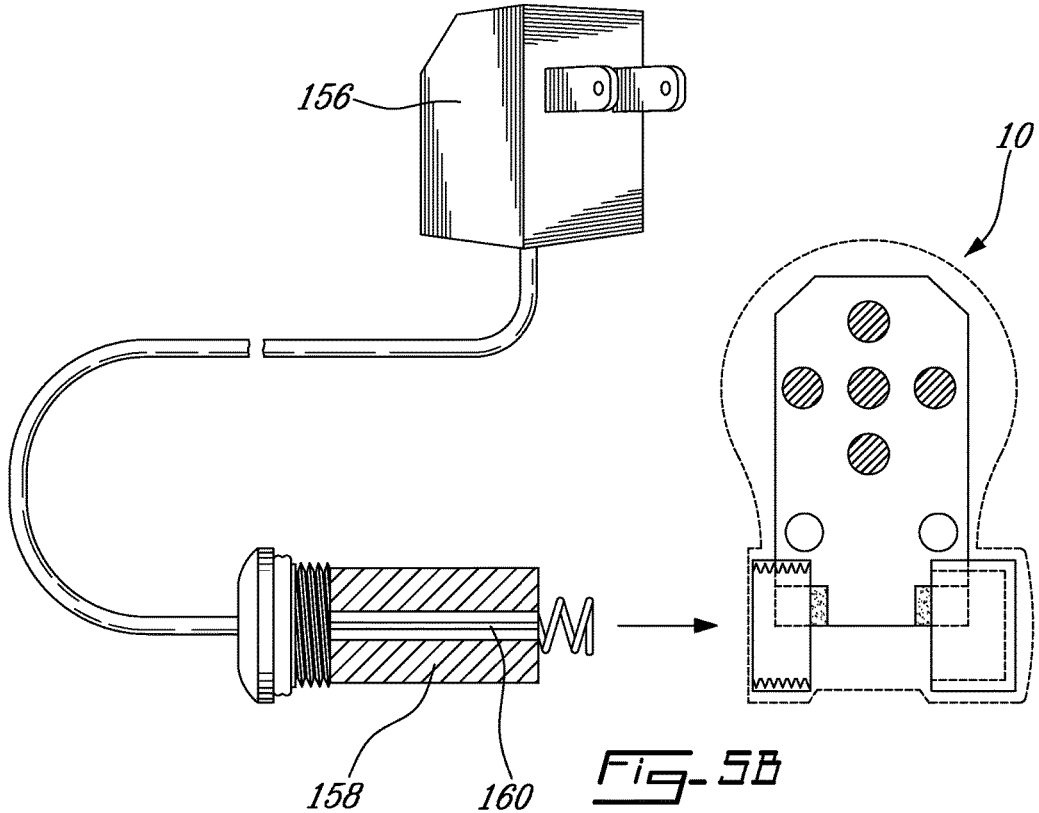

Similarly, in FIG. 5b, in a second alternative embodiment a 120 VAC transformer 156 having a 3V DC output uses mains current to supply the device via an adapter cap 18' comprised of a hollow plug 158 manufactured from a dielectric material isolating a central conductor 160.

Referring now to FIG. 6, in a third illustrative embodiment the adapter cap can be modified to house a rechargeable battery 162, for example a rechargeable 3.6V lithium battery, and battery charger circuit 164. Power for the battery charger circuit 164 could be provided, for example, via a car lighter adapter 150 which would plug into a socket 166 located in the adapter cap 18'.

Referring now to FIG. 7, in a fourth illustrative embodiment, the adaptor cap provides a sealed interconnect 168 between a signaling device as in 10 and, for example, an electrical junction box 170, or the like. Typically foreseen for use in harsh environments, when device 10 has been activated, for example by rotation of the rotary switch 172 to a predefined signaling position, interconnection of the ends of the insulated conductive wires 174, 176 provides current to the device 10, thereby causing it to emit signals according to the selected switch position. By placing a switch 178, for example a proximity sensor, gas sensor or the like, between the ends of the conductive wires 174, 176, the device 10 can be used in a variety of signaling applications.

Referring now to FIG. 8, in a fifth illustrative embodiment, the adaptor cap 18 is replaced by a power module 180 comprised of a supplementary battery compartment 182 for holding a supplementary DC power source 184, such as a battery or battery pack. The supplementary battery compartment 182 is manufactured from a similar non-conductive material as the housing of the device 10 and, in operation, is simply screwed onto the threaded end 20 of the battery compartment 12. The power module 180 also includes an electronic converter 186 for converting/conditioning the voltage output of the supplementary power source 184 to match the nominal voltage output of the battery 14. Such converter electronics comprise, for example, a diode bridge as known in the art and, as necessary, a DC/DC converter or other circuits for conditioning the output voltage and current, such as a charge pump, voltage booster, staged voltage multiplier circuit or the like. As known in the art, charge pumps, voltage boosters, staged voltage multiplier circuits and the like are able to generate output voltages which differ from their input voltages, in its simplest form allowing the voltage to be doubled by driving a circuit comprised of capacitors and diodes using a square wave. Other circuits, which are typically in the form of single-chip integrated packages, allow for accurate setting of the output voltage to predetermined values.

Still referring to FIG. 8, in operation, and as discussed above, the output voltage of the converter 186 is conditioned to match a nominal voltage output (i.e. the rated or characteristic operating voltage) of the battery 14. The output voltage of the converter 186 is attached in parallel with the battery 14 (via the provision of suitable interconnections such as insulated conductors as in 188 between the power module 180 and the battery 14) between the first conductive pad (reference 22 on FIG. 2) and the second conductive pad (reference 28 on FIG. 2). It will now be apparent to a person of ordinary skill in the art that provision of the power module 180 allows the device 10 to be powered by a variety of alternative DC power sources, such as batteries of different voltages or battery packs comprised of a plurality of individual cells and the like (all not shown) without removing the battery 14 from the battery compartment 12. Of course, the use of batteries or battery packs having different shapes in the power module 180 will require similar changes in the supplementary battery compartment 182.

Referring now to FIG. 9, in a sixth illustrative embodiment, the adaptor cap is replaced by a laser module 190 which can be mounted on the threaded end 20 of the battery compartment 12. The laser module 190 emits laser light through an aperture located at an emitting end 192 and can include a power source (not shown) or, alternatively, with provision of appropriate interconnections, can also be powered by the battery 14. Additionally, the laser module 190 can be combined with the power module 180 to provide a self power laser module which also can be used to power the device 10.

It is to be understood that the invention is not limited in its application to the details of construction and parts illustrated in the accompanying drawings and described hereinabove. The invention is capable of other embodiments and of being practised in various ways. It is also to be understood that the phraseology or terminology used herein is for the purpose of description and not limitation. Hence, although the present invention has been described hereinabove by way of preferred embodiments thereof, it can be modified, without departing from the spirit, scope and nature of the subject invention as defined in the appended claims.

What is claimed is:

1. A light emitting device comprising:
    a first part comprising:
        an emission module operative on the application of battery power and comprising at least one light emitting element;
        a battery compartment shaped for receiving a battery pack comprising a standardized battery having a standardized cylindrical format comprising a length and a width, said battery compartment forming a first unit with the emission module and being adapted to receive the standardized battery substantially along its full length, said battery compartment comprising an open end defining an opening larger than said width and through which the standardized battery can be inserted into said battery compartment and a closed end opposite said open end;
        a switch for turning on and off said emission module; and
    a second part comprising:
        a battery compartment cap for closing said opening and configured for insertion into said battery compartment, said battery compartment cap comprising a cap end and a battery end housing a rechargeable battery pack such that said rechargeable battery pack is insertable into said battery compartment through said opening as a second unit with said battery compartment cap and such that said battery end is adjacent said closed end and further comprising a battery charger circuit for recharging said rechargeable battery pack and an external socket exposed on said cap end coupleable to an external power source for receiving power for recharging said rechargeable battery pack.

2. The device of claim 1, wherein said standardized cylindrical format is selected from a group consisting of AA, AAA and CR123.

3. The device of claim 1, wherein the light emitting device is a signalling device, said switch is a multi-position switch for selecting one of a plurality of predetermined control signatures and further wherein when said switch is closed, said at least one illuminating element is illuminated according to said selected control signature.

4. The device of claim 1, wherein said external power source is a car lighter socket.

5. The device of claim 1, wherein said at least one light emitting element emits visible light.

6. The device of claim 3, wherein said multi-position switch is a rotary switch.

7. The device of claim 1, further comprising a first cap covering said opening, and wherein said battery compartment cap replaces said first cap.

8. The device of claim 1, wherein said at least one light emitting element comprises an LED.

9. The device of claim 1, wherein said battery cap substantially fills said battery compartment.

10. A rechargeable battery pack for a device operative on the application of battery power and comprising a battery compartment dimensioned for receiving at least one removeable standardized battery having a standardized format, the battery compartment further comprising an open end defining an opening dimensioned for receiving the removeable standardized battery there through and a closed end opposite said open end, the rechargeable battery pack comprising:
    a battery end comprising a rechargeable battery; and
    a cap end housing a battery charger circuit for recharging said rechargeable battery and comprising a socket couplable to an external power source for receiving power for recharging said battery;
    wherein said battery end is dimensioned to be insertable into the battery compartment through the opening and such that when fully inserted into the battery compartment, said battery end is adjacent the closed end and said cap end seals the opening.

11. The device of claim 1, wherein the device further comprises first threaded surface adjacent the opening and said cap end comprises a second threaded surface and wherein the opening is sealable by said cap end through mating said second threaded surface with the first threaded surface.

12. The device of claim 10, wherein the standardized cylindrical format is selected from a group consisting of AA, AAA and CR123.

13. The device of claim 10, wherein said external power source is a car lighter socket.

14. The device of claim 10, further comprising a first cap covering the opening, and wherein said cap end replaces said first cap.

* * * * *